United States Patent [19]

Yoshimori

[11] Patent Number: 5,182,859

[45] Date of Patent: Feb. 2, 1993

[54] CABLE STRIPPER

[75] Inventor: Naoki Yoshimori, Tokyo, Japan

[73] Assignee: Canare Electric Co., Ltd., Aichi, Japan

[21] Appl. No.: 804,794

[22] Filed: Dec. 9, 1991

[30] Foreign Application Priority Data

Aug. 8, 1991 [JP] Japan .................................. 3-199223

[51] Int. Cl.⁵ .............................................. B21F 13/00
[52] U.S. Cl. .................................................. 30/90.6
[58] Field of Search ...................... 30/90.6, 91.1, 91.2, 30/90.1, 90.4

[56] References Cited

U.S. PATENT DOCUMENTS

| | | | |
|---|---|---|---|
| 4,117,749 | 10/1978 | Economu | 30/90.6 |
| 4,543,717 | 10/1985 | Luka | 30/90.6 |
| 4,979,299 | 12/1990 | Bieganski | 30/90.6 |
| 5,003,846 | 4/1991 | Yagawa | 30/90.6 |
| 5,077,895 | 1/1992 | Okubo et al. | 30/90.6 |

Primary Examiner—Douglas D. Watts
Assistant Examiner—Paul M. Heyrana
Attorney, Agent, or Firm—Koda & Androlia

[57] ABSTRACT

A cable stripper, which makes both the circumferential and axial cuts in the covering of a cable by a simple operation, including a cable guide with slits, operation levers that have three circular blades which are parallel with one another, and a lower blade. The edges of the circular blades are oriented perpendicular to the axis of the cable that is brought into the cable guide, and the edge of the lower blade is oriented parallel with the axis of the cable. The circumferential cuts of the cable is formed when the circular blades are moved into the cable guide through the slits by a spring force and turned around the cable, and the axial cut of the cable is formed, when the cable is pulled out from the cable guide, by the lower blade that is projected into the cable guide.

3 Claims, 6 Drawing Sheets

CABLE STRIPPER

BACKGROUND OF THE INVENTION

1. Field of the Invention

The present invention relates to a cutter and more particularly to a cable stripper which cuts and strips a cable covering.

2. Prior Art

One example of a cable stripper, which cuts the cable covering along the circumference of the covering and the axis of the cable, is disclosed in the U.S. Pat. No. 3,914,864.

In this cable stripper, two guides which rotatably hold a cable are provided between a pair of levers. The cable is held by one of these guides and the covering of the cable is cut along the circumference by a first blade installed on the guide. Then, the cable is repositioned so that it is held by the other guide, and the covering of the cable is cut along the axis of the cable by the second blade provided on the guide. The cutting along the axis of the cable is performed to facilitate the stripping of the cable covering.

However, in the conventional stripper, the position of the cable must be shifted from one guide to the other in order to make both circumferential and axial cuts. Therefore, extra work is required, and working efficiency is poor.

SUMMARY OF THE INVENTION

Accordingly, the object of the present invention is to provide a cable stripper which forms both circumferential and axial cuts in the cable covering by means of a simple operation.

The cable stripper of the present invention is characterized by the fact that the stripper comprises (a) a main stripper body, (b) a cable holder mounted on the main stripper body to hold the end portion of a cable, the holder being free to rotate about the axis of the cable, (c) operating levers which are rotatably installed on the main stripper body, (d) first blades attached to the tip portions of the operating levers, edges of the first blades being oriented perpendicular to the axis of the cable inside the cable guide provided in the main stripper body and moving a prescribed amount inside the cable guide when the operating levers are rotated in one direction, (e) a second blade installed in the main stripper body so that the blade is free to move toward the interior of the cable guide, the edge of the second blade being parallel with the axis of the cable inside the cable guide, and (f) a moving mechanism which moves the edge of the second blade a prescribed amount inside the cable guide by the rotation of the operating levers.

In the cable stripper of the present invention, the first blades are used to form circumferential cuts in the cable covering, the second blade is used to form a cut in the axial direction of the cable covering, and these blades are projected into the same cable guide and moved and operated by common operating levers. Accordingly, both circumferential and axial cuts are formed in the covering of the cable, that is inside the cable guide, very easily by operating the operating levers with the cable guided by a single cable guide.

BRIEF DESCRIPTION OF THE DRAWINGS

FIGS. 9(a) and 9(b) are cross sections taken along line VII—VII in FIG. 5 wherein FIG. 9(a) shows the operating lever of the wire stripper pressed down and FIG. 9(b) shows the operating lever further pressed down;

DETAILED DESCRIPTION OF THE INVENTION

Referring to the Figures, an embodiment of the present invention will be described below:

First, a constitution of the present invention will be described mainly with reference to FIG. 1.

Figure 3:
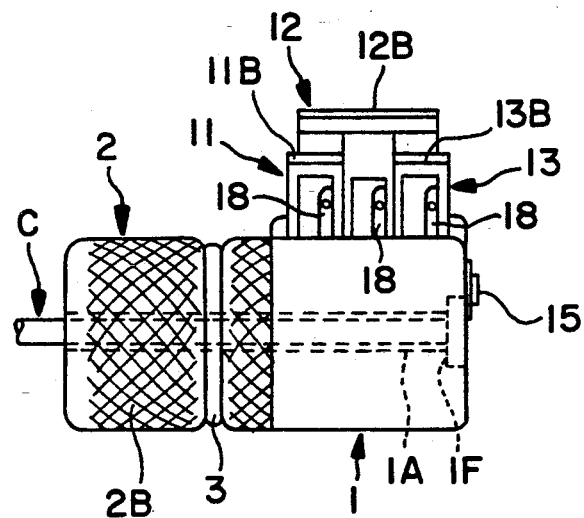
FIG. 3 is a view in the direction indicated by arrow III in FIG. 2.
Figure 4:
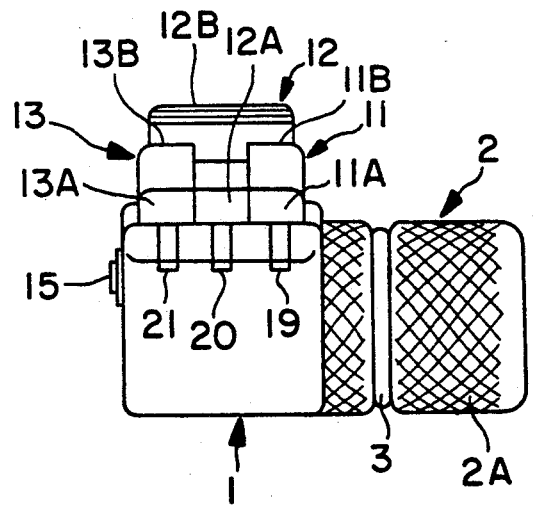
FIG. 4 is a view in the direction indicated by arrow IV in FIG. 2.
Figure 5:
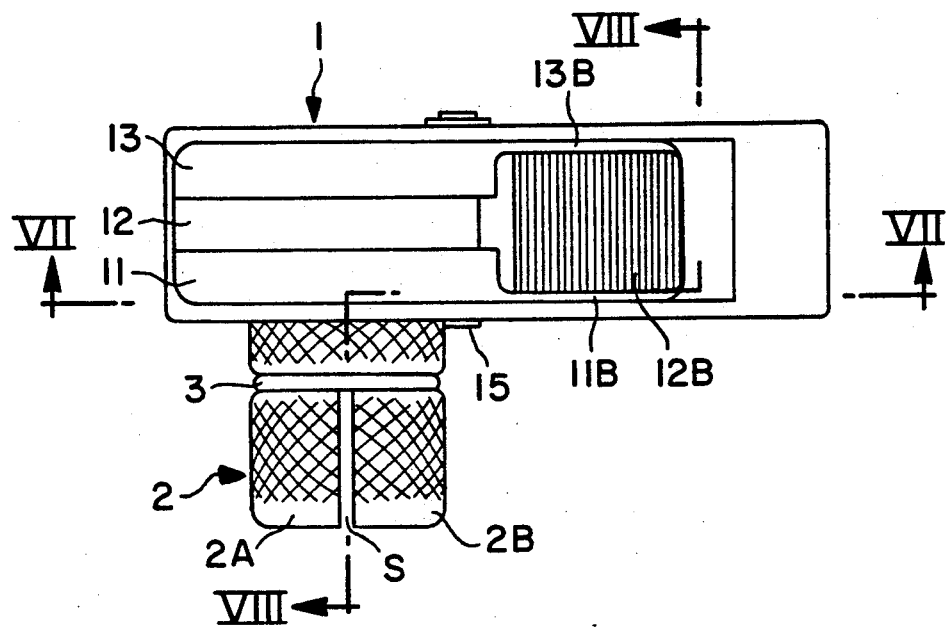
FIG. 5 is a view in the direction indicated by arrow V in FIG. 2.

Numeral 1 is a main body, and a cable can be inserted from the direction indicated by arrow D into a cylindrical cable guide 1H, that has a guide hole 1A. An operating hole 1B is also provided on the main body 1 so that a user's finger is inserted thereinto. A step part 1F (as shown in FIG. 3) used for determining the length of the inserted cable is formed in the main body 1.

Figure 7:
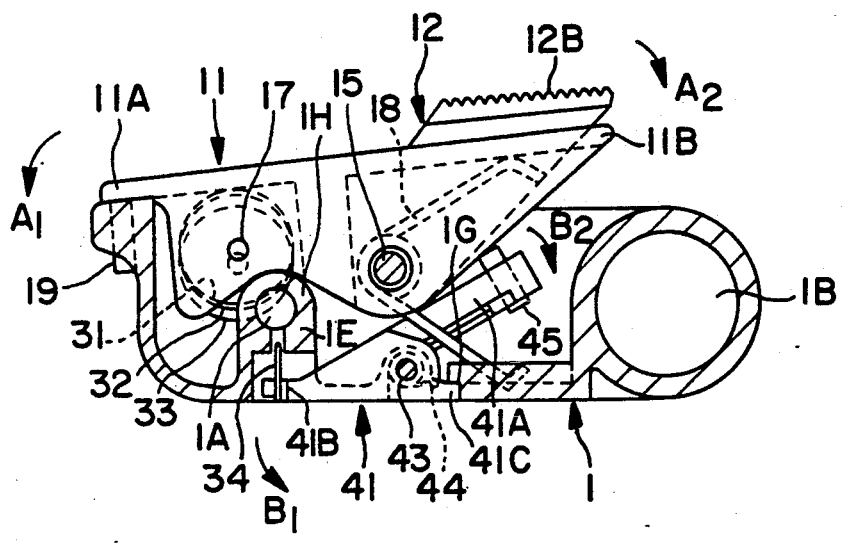
FIG. 7 is a cross section taken along line VII—VII in FIG. 5.

Three slits S1, S2, and S3 are formed in the upper portion of the circumferential wall of the cable guide 1H at predetermined intervals along the length of the cable guide 1H. A guide groove 1E (as shown in FIG. 7) is formed in the lower portion of the circumferential wall of the cable guide 1H along the axis of the cable guide 1H.

Figure 2:
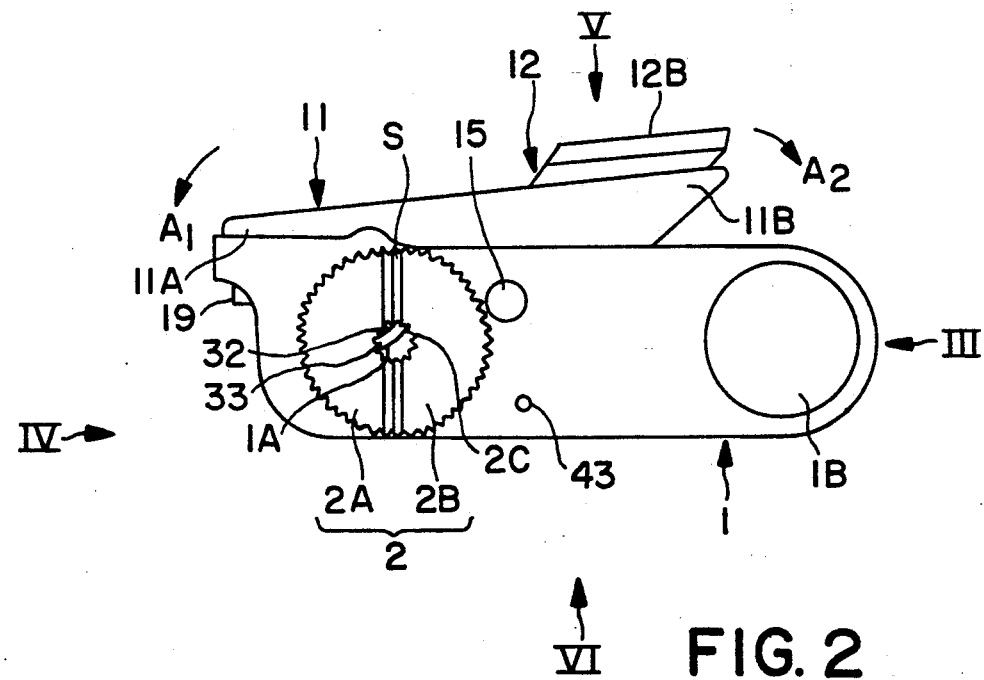
FIG. 2 is a front view of the wire stripper illustrated in FIG. 1.

A round shaped holder flange 1C is provided on the side wall of the main body 1 so that a cable holder 2 is mounted thereon. The cable holder 2 is comprised of two half-cylinder form holder parts 2A and 2B and is rotatable on the flange 1C. The cable holder 2 has a gap (s) between the holder parts 2A and 2B (see FIG. 2), and as seen in FIG. 3, an O-ring 3 combines the holder parts 2A and 2B into a single body. Accordingly, a cable (coaxial cable) C can be clamped by the inside wall of the holder parts 2A and 2B when the user squeezes the end portions (from which the cable C is inserted) of the holder parts 2A and 2B so that facing surfaces of the holder 2A and 2B are caused to approach each other. A serration 2C shown in FIG. 2 is for preventing the cable from slipping out of the holder parts 2A and 2B.

Three levers 11, 12, and 13 are rotatably installed in the main body 1 by a pin 15 with a collar 14. The operating part 12B of the central lever 12 extends slightly over the operating parts 11B and 13B of the levers 11 and 13 as best shown in FIG. 3. Therefore, when the operating part 12B of the central lever 12 is pressed, the levers 11 and 13 are also pressed down by the under surface of the operating part 12B.

Each of the circular blades 31, 32, and 33 is set in a inner space 16A of spacers 16 (only one shown in FIG. 1) and three spacers 16 containing the blades 31, 32, and 33, respectively are installed at the tip portions of the levers 11, 12, and 13 by pins 17. The width of the inner space 16A is slightly larger than the width of the blades 31, 32, and 33 so that each of the blades 31, 32, and 33 is rotatable in the inner space of each spacer 16 without receiving any lateral pressure.

The levers 11, 12, and 13 are urged by springs 18 provided inside each of the levers so that the blades 31, 32, and 33 stays inside the slits S1, S2, and S3, respectively. The pivotal motion of the levers about the pin 15 is controlled by the tip portions 11A, 12A, and 13A of the levers coming into contact with setscrews 19, 20, and 21 which are screwed into the main body 1. The height of the setscrews are adjusted by rotating them.

A passive lever 41, which is an operating mechanism for the lower blade (described below), is rotatably provided in the main body 1 by a pin 43 through a collar 42, and a setscrew 45 is installed at the end of the operating part 41A of the passive lever 41. A lower blade 34 which is roughly of trapezoidal shape is loosely mounted to the tip portion 41B of the passive lever 41. The lower blade 34 has a side edge 34A, an upper edge 34B, and a cutting point 34C.

Figure 1:
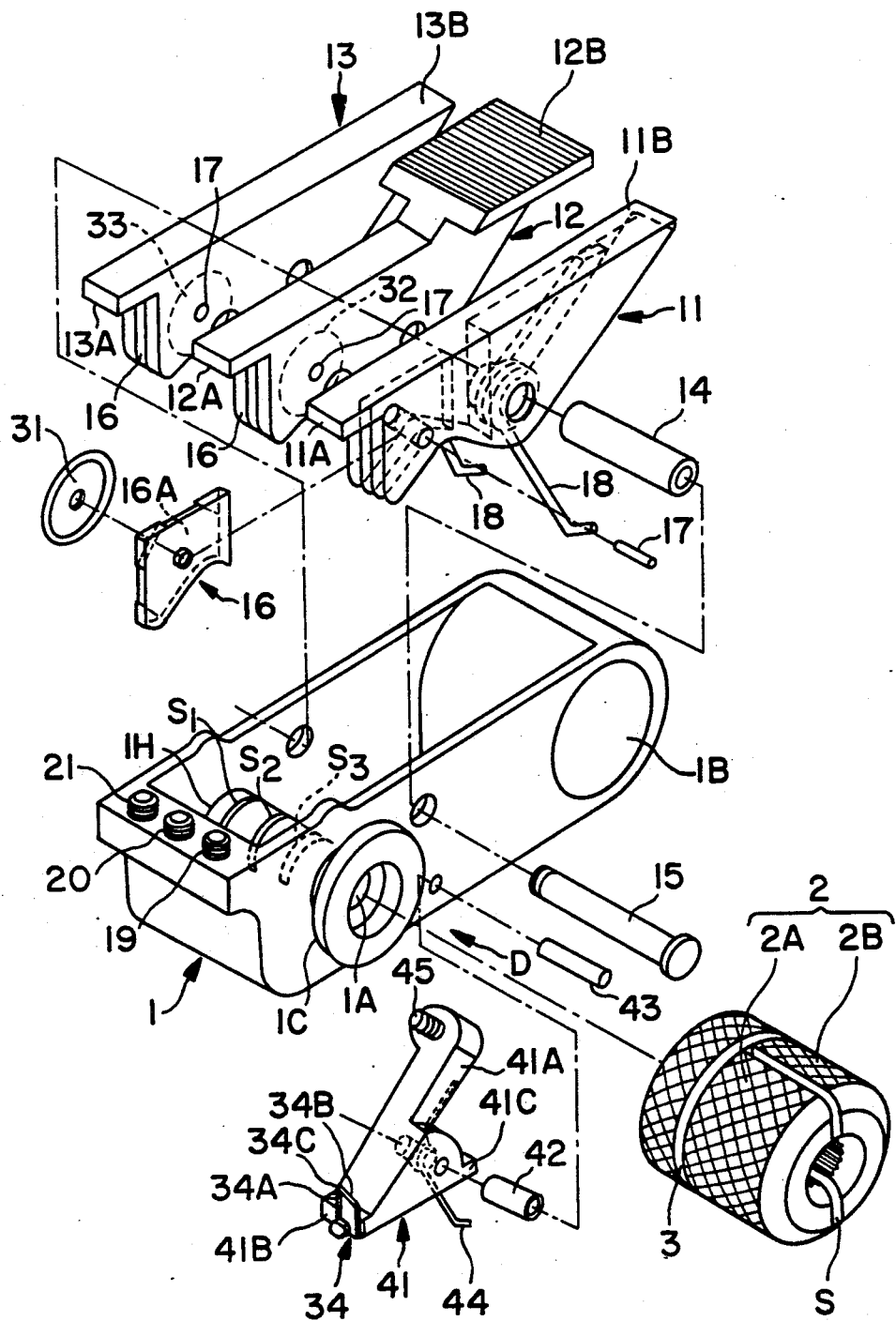
FIG. 1 is an exploded perspective view which illustrates one embodiment of the wire stripper according to the present invention.

As shown in FIGS. 1 and 7, the passive lever 41 is urged by a spring 44 so that the setscrew 45 touches the under surface of the lever 11, and the pivotal movement of the passive lever 41 about the pin 43 is restricted by a step part 1G of the main body 1 when a stopper part 41C which is formed on the passive lever 41 comes into contact with the step part 1G.

Figure 6:
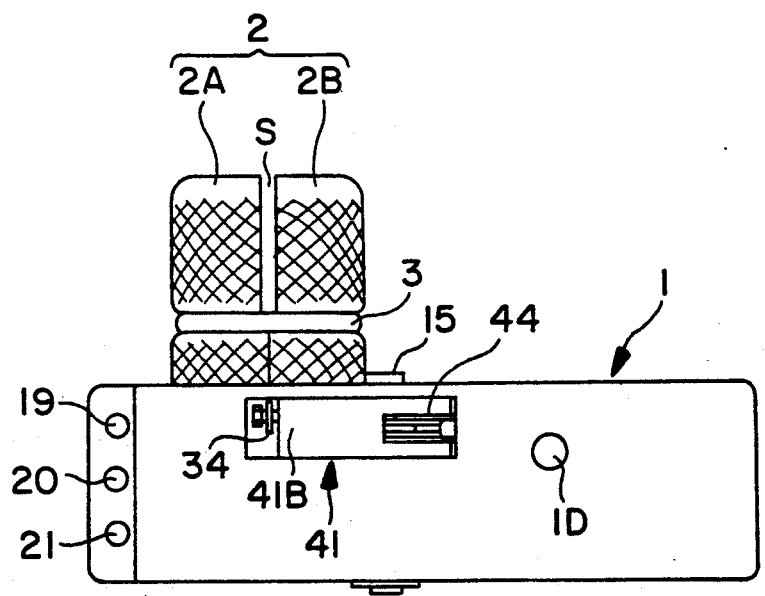
FIG. 6 is a view in the direction indicated by arrow VI in FIG. 2.

As shown in FIG. 6, a through hole 1D is provided to the under surface of the main body 1 so that the setscrew 45 is turned by a tool (not shown) inserted into the through hole 1D. The pivotal movement of the passive lever 41 is thus adjusted by the setscrew 45.

When the lever 11 is pressed down as shown by arrow A2 in FIG. 7, the passive lever 41 is turned by the under surface of the lever 11 that presses down the top of the setscrew 45, thus causing the lower blade 34 to be slightly projected into the guide hole 1A through the guide groove 1E.

Figure 9A:
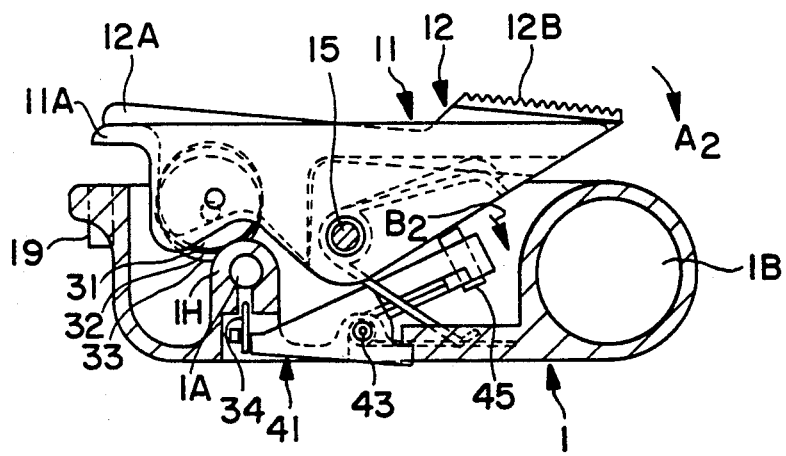
Figure 9B:
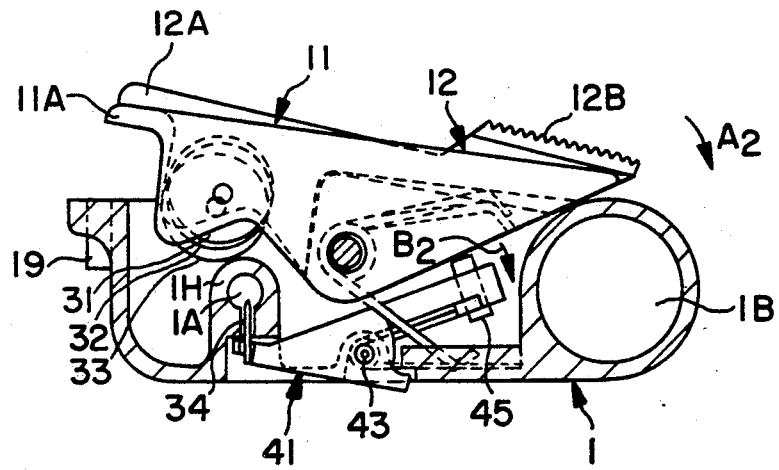
Figure 8:
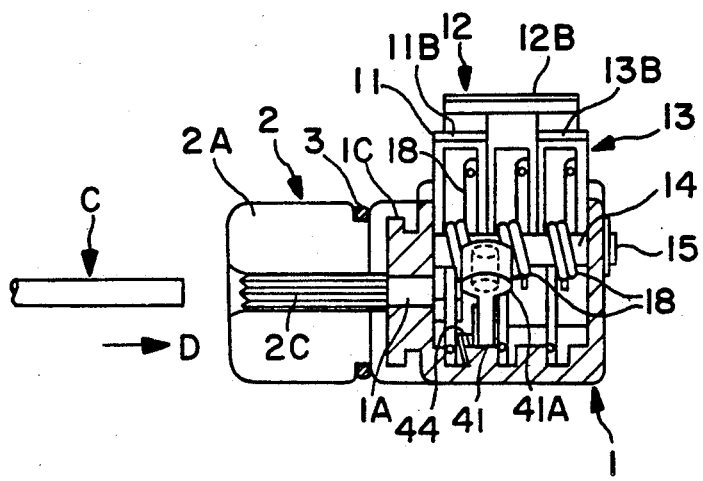
FIG. 8 is a cross section taken along line VIII—VIII in FIG. 5.
Figure 10A:
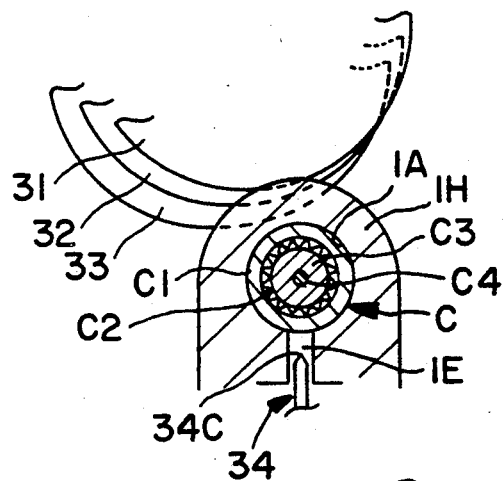
FIGS. 10(a), 10(b), and 10(c) are enlarged cross sections of essential parts, which illustrate different states of movement of the blades shown in FIG. 7.

Next, the operation of the stripper to cut the coaxial cable C that, as shown in FIG. 10a, generally comprises an outer covering C1, an outer conductor C2, an inner covering C3, and a core conductor C4, will be described below:

First, the operating part 12B of the central lever 12 is slightly pressed down so that the tip portions of the levers 11, 12, and 13 are moved upward, thus being released from the interior of the guide hole 1A of the cable guide 1H. In this case, the lower blade 34 is not projected into the guide hole 1A as shown in FIG. 9a. The detail is shown in FIG. 10a.

Next, the cable C is inserted into the interior of the guide hole 1A through the cable holder 2 from the direction indicated by arrow D in FIG. 1 until the end of the cable touches the step part 1F (see FIG. 3). The insertion of the cable C is confirmed by looking at the end of the cable C through the other end of the guide hole 1A.

If the central lever 12D is completely pressed, and not slightly pressed during the insertion of the cable C, the lower blade 34 is projected into the guide hole 1A, and the cable is blocked by the lower blade 34. However, since the lower blade 34 has some degree of looseness and is not projected into the guide hole 1A, the cable C can be inserted into the guide hole without being blocked.

After the insertion of the cable, the operating part 12B of the central lever 12 is released, causing the levers 11, 12, and 13 to be returned to the original position by the spring 18. As a result, the blades 31, 32, and 33 are moved into the slits S1, S2, and S3 respectively and come into contact with the inserted cable C.

Next, the cable holder 2 is tightly gripped by one hand so that the gap (S) between the holder parts 2A and 2B becomes narrower, and the cable is tightly held by the serration of the cable holder 2.

Then, a finger (preferably small finger) of the other hand is inserted into the operating hole 1B, and the main body 1 is rotated about the axis of the cable C. As a result, the blades 31, 32, and 33 are moved around the circumference of the cable C while they are rotated. The cable C is thus gradually cut by the blades 31, 32, and 33 that are urged by the springs 18 toward the center of the cable C until the tip portion 11A, 12A, and 13A of the levers 11, 12, and 13 come into contact with the setscrews 19, 20, and 21, respectively.

Figure 10B:
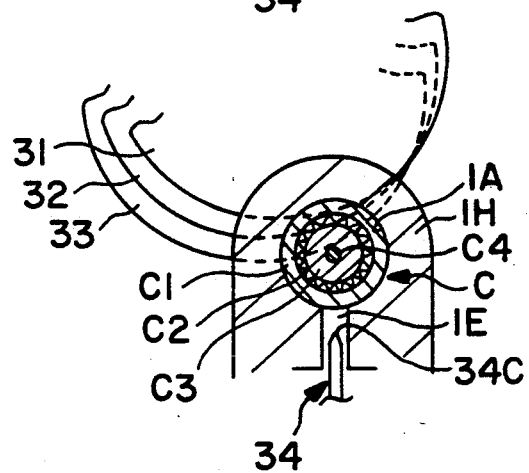

As described above, since the cutting amounts of the cable can be determined by the projecting amount of the setscrews 19 through 21, the setscrews 19 through 21 are adjusted such that the blade 31 cuts into the outer covering C1, the blade 32 cuts into the outer conductor C2, and the blade 33 cuts into the inner covering C3 as shown in FIG. 10b.

Figure 10C:
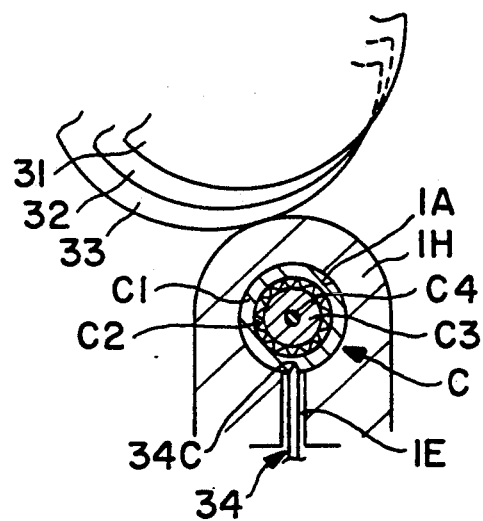

Next, when the operating part 12B of the central lever 12 is pressed so that the levers 11, 12, and 13 are moved back in the direction indicated by arrow A2, the lower blade 34 is projected into the guide hole 1A through the guide groove 1E as shown in FIG. 10c. Therefore, the lower blade 34 cuts into the outer covering C1 of the cable C. The amount the cutting edge 34C cuts into the cable C is set by adjusting the height of the setscrew 45.

Afterward, the gripping of the cable holder 2 is loosened, and the cable C is pulled out from the guide hole 1A through the cable holder 2. When the cable is pulled out, the outer covering C1 of the cable C is cut along the axis of the cable C by the lower blade 34.

As mentioned above, three circumferential cuts of different depths and axial cut are formed in the end portion of the cable C. As a result of the circumferential cuts and the axial cut, the end portion of the cable C can be stripped in three stages and the outer covering C1 is easily be stripped away.

Furthermore, a lower blade having the cutting edge that extends a predetermined length along the axis of the cable C, may also be used. If the cutting edge of the lower blade has substantially the same length as the cable guide 1H, an axial cut, which has a length corresponding to the length of the cutting edge of the lower blade, is formed on the outer covering C1 of the cable C by causing the cutting edge of the lower blade 34 to cut into the cable C while the blades 31, 32, and 33 are still cutting into the cable C.

In the cable stripper of the present invention, circular blades which are used to form circumferential cuts in the covering of the cable and a lower blade which is used to form an axial cut in the covering of the cable are installed so as to be moved into and out of the same cable guide, and such movements are operated by means of common operating levers. Accordingly, circumferential and axial cuts can be very easily formed in the covering of the cable by operating the operating levers with the cable guided by a single guide part.

What is claimed is:

1. A cable stripper comprising:

a main stripper body;

a cable holder rotatably mounted on said main stripper body and capable of guiding an end portion of a cable thereinto, said main stripper body being free to rotate about the axis of said cable;

operating levers pivotally installed in said main stripper body such that all of said operating levers pivot together when one of said operating levers is depressed, said operating levers being installed on said main stripper body adjacent each other along said axis of said cable and including first circular blades for cutting said cable circumferentially which are mounted to said tip portions of said operating levers with edges of said first circular blades being oriented perpendicular to the axis of said cable which is inserted in a cable guide formed in said stripper body so that said edges are moved by a prescribed amount into said cable guide when said operating levers are pivoted in one direction;

a second blade for cutting said cable longitudinally which is installed in said main stripper body so as to move toward the interior of said cable guide, an edge of said second blade being oriented parallel with the axis of said cable inside said cable guide; and a second blade moving assembly which moves the edge of said second blade a prescribed amount into said cable guide when said operating levers are rotated in said one direction.

2. A cable stripper according to claim 1 characterized in that said second blade moving assembly moves the edge of said second blade out of said guide part when said operating levers are rotated in the other direction.

3. A cable stripper according to claim 1 further comprising a spring means for biasing each of said operating levers and said second blade moving assembly such that said first and second blades engage with said cable when said operating levers are pivoted in said one direction by said spring means.

* * * * *